United States Patent Office 2,740,898
Patented Apr. 3, 1956

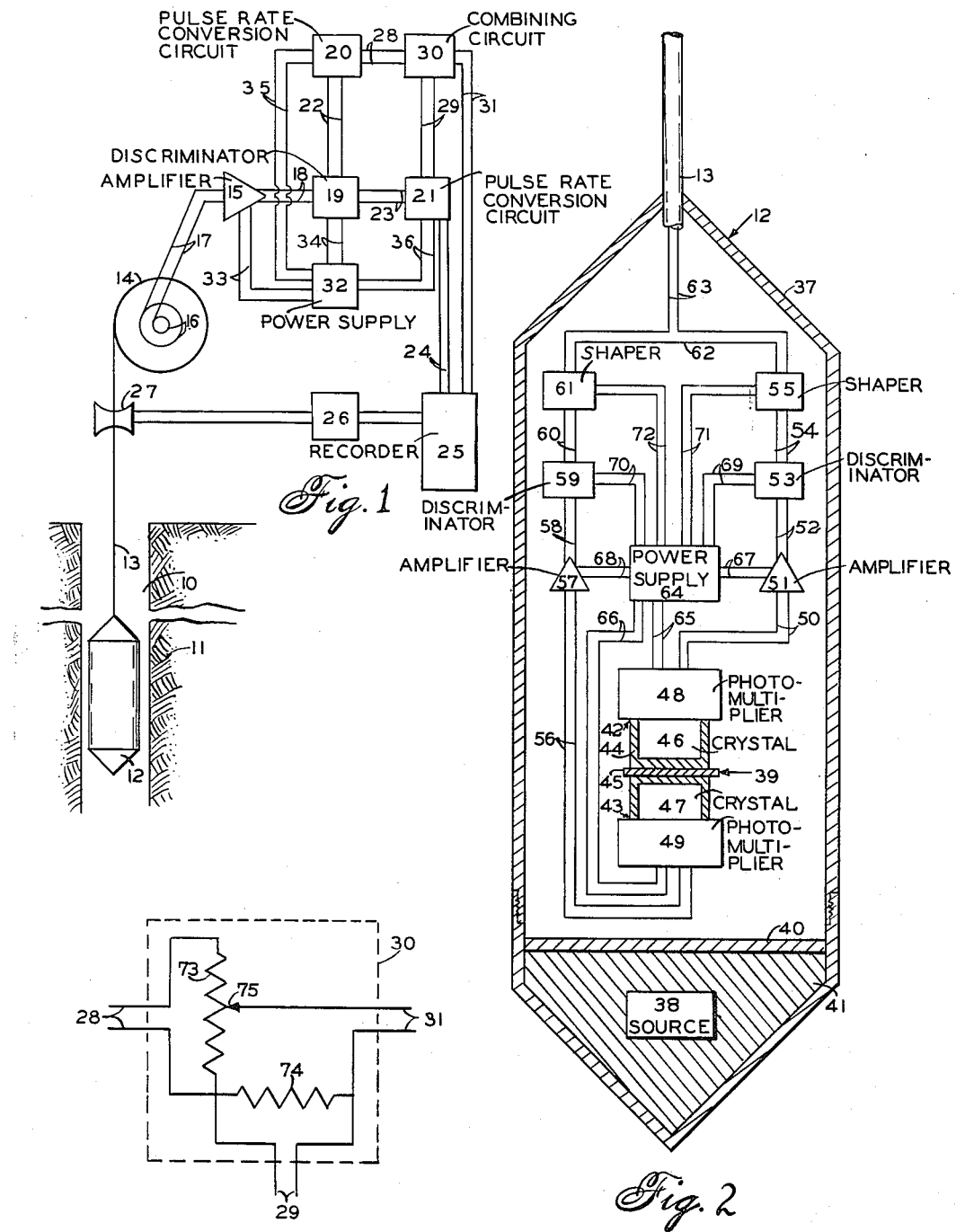

2,740,898

METHOD AND APPARATUS FOR DETECTING NEUTRONS IN THE PRESENCE OF OTHER RADIATION

Arthur H. Youmans, Tulsa, Okla., assignor to Well Surveys, Incorporated, Tulsa, Okla., a corporation of Delaware Application August 23, 1951, Serial No. 243,229

16 Claims. (Cl. 250—71)

This invention relates to the art of geophysical prospecting and more particularly to the art of radioactivity well logging wherein neutron flux is measured in the presence of gamma rays by the detection of coincident radiations resulting from neutron capture.

Most methods of the prior art for the detection of slow neutrons depend upon the observation of the effects of secondary particles which result from the capture of the neutrons. To detect neutrons in the presence of other radiation, the secondary process observed must be fundamentally different from the background radiation to be ignored. In well logging, background radiations are principally gamma rays, since alpha rays and beta rays are quickly stopped before reaching the detector and cosmic rays are not found deep in the earth. Thus, a boron trifluoride counter measures the ionizing effect of alpha particles emitted by boron following the capture of neutrons by the boron; this counter may be used in the presence of gamma radiation because the ionizing effect of alpha particles differs greatly from the ionizing effect of gamma rays. However, boron trifluoride is the only commonly available gas containing an element which both captures neutrons with a high probability and subsequently emits an alpha particle.

The maximum efficiency of a boron trifluoride counter is not very great because the ionizable medium is not very dense. Chemical properties of the boron trifluoride prevent its use at high pressures, for at such pressures it is so dense that its ionized particles recombine before they can be collected. Also, were the boron trifluoride to be made very dense, it would stop the secondary beta particles produced by gamma rays, and this would result in as much ionization from the detection of gamma rays as from the detection of neutrons producing alpha particles of the same energy. The boron trifluoride counter utilizing gas at low density can be used to distinguish between neutrons and gamma rays because the beta particles produced by the gamma rays pass out of the gas virtually unimpeded and hence produce a much smaller signal than the signal produced by the alpha particles resulting from neutron capture by the boron.

An alternative to the boron trifluoride counter is a boron-lined counter such as the boron-lined proportional counter. The boron in this case forms a solid coating which is of course, dense; however, the boron coating must be very thin, or alpha particles resulting from neutrons captured by the boron are stopped or slowed down to the point where the resultant signal cannot be distinguished by pulse size from the signal produced in the counter by gamma rays.

The present invention makes it unnecessary to distinguish between pulses produced by neutrons and pulses produced by gamma rays and in addition provides a more efficient detector. By this invention it is proposed to measure neutron flux in the presence of gamma rays by the detection of coincident radiations resulting from neutron capture. This is possible for the reason that following the capture of thermal neutrons, most elements emit gamma rays; in fact, usually a cascade of two or more gamma rays results. Generally these gamma rays all occur within a period of $10^{-12}$ seconds and hence are practically simultaneous. The elements cadmium and samarium exhibit this multiplicity of gamma rays to a large degree. Cadmium emits on the average 4.1 gamma rays each time it captures a thermal neutron and samarium emits on the average 5.6 gamma rays when it captures a thermal neutron. Since these elements are particularly effective neutron-capturing elements, they are well suited for the detection of neutrons by the method of this invention, which depends upon capture of neutrons by an element and emission of a multiplicity of gamma rays.

In this invention, two detectors are arranged on opposite sides of cadmium or samarium or an element of similar characteristics. When a neutron is captured by the cadmium or samarium, a cascade of gamma rays will be emitted by the capturing nucleus. Since the number of gamma rays is relatively large there is an appreciable probability that both detectors will simultaneously detect gamma rays. The rate of occurrence of such coincidences is a measure of neutron flux.

Since the individual detectors are also sensitive to gamma rays arising from sources other than the samarium or cadmium, such as for example, gamma rays from the formations surrounding an oil well, this invention permits concurrent and separate measurement of both neutron flux and gamma ray flux. The neutron flux is measured by counting coincidences between the two detectors. The total number of pulses produced by the two detectors may arise either from the gamma rays of the neutrons captured by the samarium or cadmium or from other gamma rays; thus the total pulse counting rate is due partly to gamma rays and partly to neutrons. Since the number of processes due to neutrons is proportional to the number of coincidences and since the proportionality factor can be empirically determined, the total number of pulses due to neutrons can be computed and subtracted from the total number of pulses to yield a quantity proportional to the gamma ray flux.

This invention is equally operable whenever a multiplicity of any products of disintegration is emitted following neutron capture. When boron captures a neutron an alpha particle is emitted accompanied approximately 93% of the time by a gamma ray of energy of approximately 478 k. e. v. Coincident detection by two detectors indicates a neutron unambiguously. Unlike boron-lined or boron-trifluoride counters of the prior art, this invention is not dependent upon distinguishing pulse sizes, hence the detectors may be made very dense and, therefore, more efficient. No difficult pulse sorting techniques are necessary.

Although the scintillation counter is well suited for this invention since it is very dense and efficient, other types of detectors when used according to the method of this invention will produce better results than the detectors of the prior art. As above noted, in the prior art a boron-lined counter must have a very thin boron lining or the alpha particles released upon neutron capture are slowed by the boron to the point where the alpha particles cannot be distinguished by pulse size from gamma rays. This invention permits a boron-lined counter with thick boron lining to be used. With two boron-lined Geiger counters in coincidence it makes no difference that the alpha particles are slowed, for an output pulse results from detection of alpha particles and gamma rays coincidentally and does not depend upon distinguishing between pulse sizes.

Other secondary radiations may be detected in coincidence as indicative of neutron flux. For example, uranium 235 upon capture of a neutron, undergoes fission with the production of at least two high energy fragments and several gamma rays. The observation of any two coincident processes from fission is unambiguously indicative of neutron capture. For the detection of fast neutrons, uranium 238 can be used to capture the fast neutrons, and fast neutron flux would be indicated by observation of coincident processes from fission. Other elements inelastically scatter fast neutrons in which case the recoil nucleus and the excitation gamma ray may be coincidentally detected. Some elements emit simultaneously alpha particles and gamma rays or protons and gamma rays when bombarded with fast neutrons. The method of this invention may be used to detect any kind of radiation which reacts selectively with matter to produce simultaneously two observable photons or charged particles.

The method of this invention may be used for measuring resonance neutrons continuously. Resonance neutrons are those neutrons of such energy as to be selectively captured by a particular element; for example, iodine selectively captures 25 e. v. neutrons. Many elements have resonance energies at which they capture neutrons. Silver, indium, rhodium, gold, and mercury are particularly good examples. To measure neutrons of a particular energy by prior art methods one might absorb them with an element selectively capturing neutrons of the energy which it is desired to measure and detect the gamma rays thereupon emitted. A difficulty with such prior art methods which use a single gamma ray detector is that such elements may become beta active upon neutron capture and later decay; therefore, there will be a high random background if the decay products can reach the detector, as would be the case if the neutron capturing material formed the lining of the counter. Another difficulty with using a single detector is that no means is provided for distinguishing between the gamma rays induced in the capturing material and the background gamma rays. To overcome these difficulties the coincidence method of this invention may be used to detect coincidence gamma ray emission resulting from neutron capture and thereby disregard the beta and gamma background.

Therefore, the primary object of this invention is to provide a method and apparatus for making a radioactivity well log wherein neutron flux is measured in the presence of gamma rays. Another object is to make a neutron log of a well by measuring the rate at which secondary particles are coincidentally emitted following capture of neutrons in the well logging instrument. Another object is to make simultaneous neutron and gamma ray measurements by measuring the rate at which secondary particles are coincidentally emitted following neutron capture as indicative of neutron flux and using this rate to adjust the overall rate of counting gamma rays so that the net rate is indicative of the gamma ray flux coming from the formations. Still another object is to detect resonance neutrons by coincidence detection methods to eliminate high beta and gamma background counts. Other objects and advantages of the present invention will become apparent from the following detailed description when considered with the accompanying drawings, in which:

Figure 1 is a diagrammatic illustration of a geophysical well logging operation;

Figure 2 is an enlarged vertical sectional view of the subsurface instrument adapted to detect neutrons in the presence of gamma rays by the detection of coincident radiations resulting from neutron capture; and Figure 3 is a diagrammatic illustration of the combining circuit in the surface apparatus shown in Figure 1 adapted to separate components to permit simultaneous neutron-neutron and neutron-gamma well logging.

Although the present invention has broad application, it will be described in detail in connection with its application to well logging. In the art of radioactivity well logging, certain logs are made by irradiating the formations adjacent the drill hole with neutrons, and detecting gamma radiations or neutrons influenced thereby. In Figure 1 of the drawings, there is illustrated a well surveying operation by which such logs may be made. A well 10 penetrates the earth's surface 11 and may or may not be cased. Disposed within the well is subsurface instrument 12 of the well logging system. Instrument 12 houses the radiation detector. Cable 13 suspends the instrument in the well and electrically connects the instrument with surface apparatus. The cable is wound on or unwound from drum 14 in raising and lowering instrument 12 to traverse the well. Cable 13 is electrically connected to amplifier 15 through slip-rings 16 and brushes 17. The output of the amplifier 15 is connected by conductors 18 to a discriminator 19. The output of the discriminator 19 is connected to pulse rate conversion circuits 20 and 21 through conductors 22 and 23, respectively. The output of pulse rate conversion circuit 21 is connected by conductors 24 to a recorder 25 which may be driven through a transmission 26 by a measuring reel 27 over which cable 13 is drawn so that recorder 25 moves in correlation with depth as instrument 12 traverses the well. The outputs of pulse rate conversion circuits 20 and 21 are connected by conductors 28 and 29, respectively, to a combining circuit 30. The output of combining circuit 30 is connected by conductors 31 to recorder 25. The reasons why the foregoing elements are connected in the manner described will become apparent as the description proceeds. Power supply 32 supplies power for the surface apparatus in a conventional manner, all parts of the circuits being suitably isolated. Power is supplied to amplifier 15, discriminator 19, and pulse rate conversion circuits 20 and 21 through conductors 33, 34, 35 and 36 respectively.

Subsurface instrument 12 shown in Figure 1 may take the form illustrated diagrammatically in vertical section in Figure 2. Subsurface instrument 12 comprises a housing 37 which encloses a source of fast neutrons 38 and radiation detector 39 and associated circuits. A neutron absorbing shield 40 is interposed between neutron source 38 and radiation detector 39 to stop direct passage of neutrons from source to detector. If source 38 emits both neutrons and gamma rays, the source is surrounded with a high density gamma ray absorber 41 so that gamma rays emitted from the source which might strike the formations surrounding the well and return to the radiation detector are attenuated. Radiation detector 39 comprises scintillation counters 42 and 43, neutron-capturing material 44 and shielding material 45. Scintillation counters 42 and 43 comprise crystals 46 and 47, respectively, which scintillate when struck by gamma rays, and photomultipliers 48 and 49, respectively, which produce electrical pulses when photons of light from a scintillation strike them. The output of scintillation counter 42 is connected by conductors 50 to amplifier 51. The amplified pulses are applied through conductors 52 to discriminator 53 which eliminates dark current pulses. The output of discriminator 53 is applied through conductors 54 to shaper 55. The output of scintillation counter 43 is applied through conductors 56 to amplifier 57 and the amplified signal is applied through conductors 58 to discriminator 59. The output of discriminator 59 is applied through conductors 60 to shaper 61. Conductor 62 combines the outputs of shapers 55 and 61 additively, and the combined output is fed to the surface through conductors 63 and cable 13. Power is supplied from power supply 64 to photomultipliers 48 and 49, amplifiers 51 and 57, discriminators 53 and 59, and shapers 55 and 61, through conductors 65, 66, 67, 68, 69, 70, 71, and 72, respectively. Each circuit element may be suitably isolated in a conventional manner, or each element may have its own power supply. It is to be understood that as an alternative power may be supplied from the surface of the earth through cable 13, by providing the subsurface instrument with suitable transformers and rectifiers.

In making a radioactive well log with this apparatus, instrument 12 is caused to traverse the formations penetrated by the well. Neutrons emitted by source 38 irradiate the formations, and neutrons influenced by the formations are detected by radiation detector 39. When neutrons irradiate the formations, they may be scattered so as to reach the detector in which case a neutron-neutron log is made by detecting these neutrons. At the same time the neutrons produce gamma rays in the formations which impinge upon the detector 39; if the gamma rays are measured as a function of depth, a neutron-gamma log is made. The method of this invention is adapted to make both types of logs simultaneously. To make a neutron-neutron log, that is, a log made by irradiating the walls of a well with neutrons and detecting neutrons scattered thereby, the scintillation counters 42 and 43 of detector 39 must be arranged in such a way that the respective crystals 46 and 47 are close together but are separated by sufficient absorbing material 45 to prohibit the passage of electrons or light from one crystal to the other. Between and around these crystals is arranged an amount of neutron-capturing material 44 which may be made of cadmium, camarium, gadolinium or an element of similar characteristics. If enough of the neutron capturing material is placed between the crystals it will prohibit the passage of electrons from one crystal to the other and make absorbing material 45 unnecessary. Neutrons emitted from source 38 irradiate the walls of the well and are scattered by the formation so that some neutrons return to the radiation detector 39. Some of these neutrons are captured by neutron-capturing material 44. Following the capture of each neutron, a cascade of gamma rays will be emitted by the capturing nucleus. Since the number of gamma rays per neutron capture is relatively large, there is an appreciable probability that both of the counters may simultaneously detect a gamma ray. When gamma rays enter the crystal of a scintillation counter they produce electrons which in turn produce scintillations or flashes of light in the crystal. These scintillations cause the photosensitive cathode of the photomultiplier of the scintillation counter to emit electrons which are multiplied in the electron-multiplier section of the photomultiplier to produce an amplified pulse for each scintillation. The output pulses of photomultipliers 48 and 49 are further amplified by amplifiers 51 and 57, respectively. Discriminators 53 and 59 pass only pulses above a certain height in order to eliminate background pulses due to dark current in the photomultipliers. Shapers 55 and 61 shape the pulses to give them all the same shape so that each pulse has an equal effect upon counting equipment. Conductor 62 combines the outputs of shapers 55 and 61 additively so that when scintillation counters 42 and 43 detect radiation simultaneously a pulse of double height is sent to the surface. Since coincidence detection is indicative of neutron capture, the number of these pulses of double height is indicative of neutron flux.

At the surface the combined signal is again amplified by amplifier 15 to overcome loss of signal strength due to attenuation in the cable. Pulses are sorted by discriminator 19 which operates in a conventional manner to pass only pulses of double height to pulse rate conversion circuit 21. Pulse rate conversion circuit 21 operates in a conventional manner to provide direct-current output of magnitude directly proportional to the rate at which pulses of double height are applied to it; therefore, the output of pulse rate conversion circuit 21 which is recorded by recorder 25 is directly proportional to the number of coincidence pulses in scintillation counters 42 and 43 which in turn is proportional to the number of neutrons captured by neutron-capturing material 44. Hence, the record made by recorder 25 is a log of neutron flux as a function of the depth in the well at which detection occurs.

The detector may be used at the same time for making a neutron-gamma log, that is, a log made by irradiating the walls of a well with neutrons and detecting gamma rays produced thereby, since the individual detectors are sensitive to all gamma rays, those arising in the formations surrounding the well, as well as those resulting from neutron capture by neutron-capturing material 44. The total pulse counting rate is, therefore, due partly to gamma rays and partly to neutrons. The total number of pulses is sent up the cable. In sorting the pulses according to size, discriminator 19 permits only pulses of single height to pass to pulse rate conversion circuit 20, random noise pulses being eliminated. Pulse rate conversion circuit 20 provides a direct-current output directly proportional to the number of single-height pulses applied. This direct-current signal still is partly due to neutron counts, for not all neutron capture processes result in coincidence pulses since sometimes the gamma rays emitted upon neutron capture are detected in only one of the scintillation counters. These factors are constant for a particular detector arrangement and may be empirically measured in the laboratory. The total number of single-height pulses due to neutrons is then equal to the number of double-height pulses multiplied by the appropriate empirical factor, therefore, the output of pulse rate conversion circuit 21 may be multiplied by the empirically determined factor and subtracted from the output of pulse rate conversion circuit 20, to eliminate the part of the output of pulse rate conversion circuit 20 which is due to neutrons in order to yield a direct-current signal proportional to the gamma rays reaching scintillation counters 42 and 43 which are not due to neutron capture by neutron-capturing material 44. Combining circuit 30 performs the function of combining the outputs of pulse rate conversion circuits 20 and 21 to yield a signal which is recorded by recorder 25 to produce a neutron-gamma log. Combining circuit 30 is shown in detail in Figure 3. Combining circuit 30 comprises resistors 73 and 74 and voltage divider 75. The direct-current signal appearing on conductors 28 is applied across resistor 73. The signal appearing on conductors 29 is applied across resistor 74. Resistors 73 and 74 are connected together in such a fashion that the voltages across them are opposed. Voltage divider 75 divides resistor 73 to provide the proper empirical factor. This division of the voltage across resistor 73 is equal to multiplying the voltage across resistor 74 by an appropriate factor, for multiplying and dividing both function to place the voltages in the proper ratio so that when the voltage across resistor 74 is subtracted from the voltage across part of resistor 73, the resultant signal is directly proportional to the rate at which gamma rays arising from the formations strike the scintillation counter. This voltage appears on conductors 31 through which voltage is applied to recorder 25.

There are many alternatives and refinements that are embraced by this invention; for example, the absorbing material 45 will not completely prevent spurious coincidences. When a gamma ray disappears in the production of an electron, the absorbing material 45 will keep the electron from producing a scintillation in more than one crystal; however, when gamma rays are scattered with the production of Compton electrons, the scattered gamma rays may pass from one crystal through the absorbing material into the other crystal and produce electrons in the other crystal so that scintillations arise in both crystals coincidentally. If these coincidences occur at a substantial rate, it may be desired to eliminate them from the signal being recorded; since spurious coincidences occur at a rate proportional to the total number of gamma rays and since the constant of proportionality can be empirically determined, a voltage proportional to the number of spurious coincidences may be derived and subtracted from the output of the pulse rate conversion circuit 24 in a manner similar to that of combining circuit 30.

Although this invention has been described using crystals as the scintillation media, any scintillation media may be used. It is also within the scope of this invention to have the neutron-capturing material dispersed within the scintillation media; for example, if the neutron-capturing material 44 is to be cadmium, the scintillation crystals could be made of cadmium tungstate; in this case the coating of neutron-capturing material 44 could be omitted. As indicated above, the neutron-capturing material need not be gamma emissive, for this invention is operable as long as the neutron-capturing material emits a multiplicity of any products of disintegration. Boron, uranium 235 and uranium 238 have been mentioned above. To detect neutrons of particular energy the neutron-capturing material can be made of an element resonant at that energy. As mentioned above, iodine selectively captures 25 e. v. neutrons and hence may be used to detect such neutrons selectively.

Other coincident circuits are also within the scope of this invention. To make detection more efficient more than two scintillation counters could be disposed about the neutron-capturing material in order that gamma rays may not escape without being detected; in this case coincidences between any two scintillation counters would be indicative of neutron capture. A neutron-gamma log can also be made by passing all pulses, both single and double height, to pulse rate conversion circuit 20. In this case the direct-current signal from pulse rate conversion circuit 20 may not be directly proportional to the number of pulses, but may depend somewhat upon pulse height. The effect of pulse height can be eliminated, for it is a quantity dependent upon coincidence counts or pulses of double height and can be subtracted with the other effects of neutron capture by using a different empirical factor in combining circuit 30.

Although scintillation counters have been selected for use as detectors as described in this invention, other detectors may also be used for coincidence detection. The scintillation counter was selected because of its high density and therefore high efficiency. The scintillation counter also has a high resolving power and therefore does not give so many spurious counts from random coincidences, since the greater the resolving power the less likelihood there is for both detectors to produce counts simultaneously except when gamma rays are emitted from neutron-capturing material simultaneously. As mentioned above, boron-lined Geiger counters may be alternatively used in place of scintillation counters 42 and 43 in radiation detector 39.

It is to be understood that this invention is not to be limited to the specific modifications described but is to be limited only by the scope of the following claims, in which:

I claim:

1. A method of detecting neutrons in the presence of other radiation that comprises the steps of capturing neutrons, separately detecting separate products of the reactions resulting from said neutron capturing with a plurality of independent detectors by producing electrical pulses, and measuring the rate of occurrence of coincident pulses as a measure of neutron flux.

2. A method of radioactivity well logging that comprises the steps of traversing the formations penetrated by the well with a source of neutrons to thereby irradiate the formations with neutrons, simultaneously and by the same traversing step capturing neutrons returning from the formations, separately detecting separate products of the reactions resulting from said neutron capturing with a plurality of independent detectors by producing electrical pulses, and recording the rate of occurrence of coincident pulses as a function of the depth in the well at which detection occurred.

3. A method of radioactivity well logging that comprises the steps of traversing the formations penetrated by the well with a source of neutrons to thereby irradiate the formations with neutrons, simultaneously and by the same traversing step capturing neutrons returning from the formations with material which emits a multiplicity of gamma rays upon neutron capture, separately detecting separate gamma rays arising upon said neutron capture with a plurality of detectors by producing related electrical pulses, simultaneously detecting gamma rays coming from the formations with the same plurality of detectors, combining the electrical pulses from said plurality of detectors, transmitting the combined pulses to the surface of the earth, deriving from the combined pulses those pulses indicative of simultaneous detection by at least two of said plurality of detectors, separately deriving direct-current voltages proportional to the rate of occurrence of said combined pulses and derived pulses, respectively, electrically taking the difference between said two direct-current voltages, and simultaneously recording the direct-current voltage proportional to the rate of occurrence of said derived pulses and the voltage which is the difference between the two direct-current voltage in correlation with the depth in the well at which detection occurred.

4. A method of radioactivity well logging that comprises the steps of traversing the formations penetrated by the well with a source of neutrons to thereby irradiate the formations with neutrons, simultaneously and by the same traversing step capturing neutrons returning from the formations, separately subjecting a plurality of scintillation media shielded from one another to separate products of the reactions resulting from said neutron capturing, separately detecting scintillations in each of said media with separate photomultipliers by producing proportionally related electrical pulses, combining the electrical pulses from said photomultipliers, deriving from the combined pulses those pulses indicative of simultaneous detection by at least two of said plurality of scintillation media, and recording the rate of occurrence of derived pulses in correlation with the depth in the well at which detection occurred.

5. A method of radioactivity well logging that comprises the steps of traversing the formations penetrated by the well with a source of neutrons to thereby irradiate the formations with neutrons, simultaneously and by the same traversing step capturing neutrons returning from the formations, separately subjecting a plurality of scintillation media electrostatically and optically shielded from one another to separate products of the reactions resulting from said neutron capturing, separately detecting scintillations in each of said media with separate photomultipliers by producing proportionally related electrical pulses, separately amplifying said electrical pulses, separately shaping each series of amplified pulses to make all pulses the same size, combining said shaped pulses, transmitting the combined pulses to the surface of the earth, deriving from the combined pulses the pulses of at least double height thereby deriving pulses indicative of simultaneous detection by at least two of said plurality of scintillation media and recording the rate of occurrence of derived pulses in correlation with the depth in the well at which detection occurred.

6. A neutron detector comprising in combination neutron-capturing material, a plurality of independent radiation detectors for separately detecting separate products of the reactions resulting from neutron capture by producing electrical pulses, means for combining said electrical pulses to derive electrical pulses when at least two of said plurality of detectors produce pulses coincidentally, and means for measuring the rate of occurrence of said derived pulses as a measure of neutron flux.

7. A neutron detector comprising in combination neutron capturing material, a plurality of independent radiation detectors for separately detecting separate products of the reactions resulting from neutron capture, and means for measuring the rate of occurrence of coincident detection by at least two of said plurality of independent radiation detectors.

8. A system for making a radioactivity log of a well that comprises a subsurface instrument adapted to be lowered and raised in a well, said subsurface instrument comprising a source of neutrons, a plurality of independent scintillation media electrostatically and optically shielded from one another, a neutron-capturing material disposed about said plurality of independent scintillation media whereby separate products of the reactions resulting from neutron capture produce scintillations in separate scintillation media, separate photomultipliers for each of said media for producing proportionally related electrical pulses when exposed to scintillations in said media, separate amplifiers connected to each photomultiplier, separate discriminators connected to each amplifier for eliminating dark current pulses produced in the respective photomultipliers, means for shaping each series of amplified pulses to make all pulses the same size and shape, and means for combining all series of shaped pulses; means for traversing the well with said subsurface instrument; means for transmitting the combined pulses to the surface of the earth; and means at the surface of the earth for receiving said transmitted pulses, said means comprising means for suppressing from the combined pulses those pulses less than double height whereby the remaining pulses are indicative of simultaneous detection by at least two of said plurality of independent scintillation media, means for deriving a direct-current signal proportionally related to the rate of occurrence of said pulses of at least double height, and means for recording said direct-current signal in correlation with the depth in the well at which detection occurred.

9. A neutron detector comprising in combination material which captures neutrons with a high probability of capture and thereupon emits a multiplicity of simultaneous gamma rays for each neutron captured, said material being selected from the group consisting of samarium, cadmium, and gadolinium; a plurality of independent gamma-ray detectors for separately detecting separate gamma rays resulting from neutron capture by producing electrical pulses; and means for measuring the rate of occurrence of coincident pulses from at least two of said plurality of independent gamma-ray detectors.

10. A neutron detector comprising in combination material which captures neutrons and thereupon disintegrates with the emission of the multiplicity of products of disintegration for each neutron captured, said material being selected from a group consisting of boron, uranium 235 and uranium 238; a plurality of independent radiation detectors for separately detecting separate products of disintegration resulting from neutron capture by producing electrical pulses; and means for measuring the rate of occurrence of coincident pulses from at least two of said plurality of independent radiation detectors.

11. A neutron detector for selectively detecting neutrons of a particular energy comprising in combination a material which captures neutrons of a selected energy, a plurality of independent radiation detectors for separately detecting separate products of the reactions resulting from neutron capture by producing electrical pulses, and means for measuring the rate of occurrence of coincident pulses from at least two of said plurality of independent radiation detectors.

12. A neutron detector for selectively detecting neutrons of a particular energy comprising in combination a material which selectively captures neutrons of a particular energy, said material being selected from the group comprising silver, indium, rhodium, gold, and mercury; a plurality of independent radiation detectors for separately detecting separate products of the reactions resulting from neutron capture by producing electrical pulses; and means for measuring the rate of occurrence of coincident pulses from at least two of said plurality of independent radiation detectors.

13. A system for making a radioactivity log of a well that comprises a source of neutrons, a material which interacts with neutrons to produce a multiplicity of interaction products, a plurality of detectors independent of one another for separately detecting separate interaction products of said multiplicity by producing electrical pulses, means for combining said amplified pulses to derive electrical pulses when at least two of said plurality of detectors produce pulses coincidentally, and means for recording the rate of occurrence of said derived pulses as a measure of neutron flux in correlation with the depth in the well at which detection occurred.

14. A system for making simultaneously a neutron-neutron and a neutron-gamma log of a well that comprises a subsurface instrument adapted to be lowered and raised in a well, said subsurface instrument comprising a source of neutrons, a plurality of scintillation media electrostatically and optically shielded from one another, a neutron-capturing material disposed about said plurality of shielded scintillation media whereby separate products of the reactions resulting from neutron capture produce scintillations in separate scintillation media, separate photomultipliers exposed to each of said media for detecting said scintillations by producing proportionally related electrical pulses, separate amplifiers connected to each photomultiplier, separate discriminators connected to each amplifier for eliminating dark current pulses produced in the respective photomultipliers, means for shaping each series of amplified pulses to make all pulses the same size and shape, and means for combining the shaped pulses; means for traversing the well with said subsurface instrument; means for transmitting the combined pulses to the surface of the earth; and means at the earth's surface for receiving said transmitted combined pulses, said means comprising means for separating from the combined pulses those pulses less than double height whereby the remaining pulses are indicative of simultaneous detection by at least two of said plurality of scintillation media, means for deriving a first direct-current signal proportionally related to the rate of occurrence of said pulses of at least double height, means for deriving a second direct-current signal proportionally related to the number of pulses of single height, electrical means for combining the said first and second direct-current signals subtractively to provide a third direct-current signal, and means for recording said first and third direct-current signals in correlation with the depth in the well at which detection occurred.

15. A system for making a radioactivity log of a well that comprises a subsurface instrument adapted to be lowered and raised in a well, said subsurface instrument comprising a source of neutrons, a plurality of independent scintillation media, a neutron-capturing material disposed about said plurality of independent scintillation media whereby separate products of the reactions resulting from neutron capturing produce scintillations in separate scintillation media, separate photomultipliers exposed to each of said media for producing proportionally related electrical pulses, separate amplifiers connected to each photomultiplier, and means for combining the amplified pulses; means for traversing the well with said subsurface instrument; means for transmitting the combined pulses to the surface of the earth; and means at the earth's surface for receiving said transmitted combined pulses, said means comprising means for separating from the combined pulses those pulses indicative of simultaneous detection by at least two of said plurality of independent scintillation media, means for deriving a direct-current signal proportionally related to the rate of occurrence of said derived pulses, and means for recording said direct-current signal in correlation with the depth in the well at which detection occurred.

16. A method of detecting neutrons in the presence of gamma rays that comprises the steps of capturing neutrons with neutron-capturing material, detecting products of the reactions resulting from neutron capture by producing related electrical pulses, independently detecting other products of the same reactions by producing related electrical pulses, combining said electrical pulses, deriving from the combined pulses those pulses which have been coincidentally produced, and measuring the occurrence of said coincidences.

References Cited in the file of this patent

UNITED STATES PATENTS

| | | |
|---|---|---|
| 2,220,509 | Brons | Nov. 5, 1940 |
| 2,349,753 | Pontecorvo | May 23, 1944 |
| 2,351,028 | Fearon | June 13, 1944 |
| 2,469,460 | Fearon | May 10, 1949 |
| 2,508,772 | Pontecorvo | May 23, 1950 |
| 2,512,020 | Herzog | June 20, 1950 |
| 2,517,404 | Morton | Aug. 1, 1950 |
| 2,543,676 | Thayer et al. | Feb. 27, 1951 |
| 2,550,106 | Coltman et al. | Apr. 24, 1951 |
| 2,590,874 | Krasnow et al. | Apr. 1, 1952 |
| 2,648,012 | Scherbatskoy | Aug. 4, 1953 |

OTHER REFERENCES

"Radioactivity and Nuclear Physics," Cork, 2nd edition, June 1950, pub. by Van Nostrand Co. Inc.

"Electronic Classifying, Cataloguing and Counting Systems," Parson, AECD—1827, Mar. 25, 1948, pp.1–15.